United States Patent
Lockery

(10) Patent No.: US 6,172,309 B1
(45) Date of Patent: Jan. 9, 2001

(54) SHEAR BEAM LOAD CELL AND METHOD FOR MAKING IT

(75) Inventor: Harry E. Lockery, Sudbury, MA (US)

(73) Assignee: Flintec, Inc., Hudson, MA (US)

(*) Notice: Under 35 U.S.C. 154(b), the term of this patent shall be extended for 0 days.

(21) Appl. No.: 09/544,617

(22) Filed: Apr. 6, 2000

(51) Int. Cl.[7] ................ G01L 1/04; G01G 3/08
(52) U.S. Cl. ............ 177/211; 177/229; 73/862.627; 73/862.629; 73/862.634
(58) Field of Search ................ 177/211, 229; 73/862.627, 862.629, 862.632, 862.634, 862.639

(56) References Cited

U.S. PATENT DOCUMENTS

| | | | |
|---|---|---|---|
| 3,602,866 | * 8/1971 | Saxl | 177/211 |
| 4,282,748 | * 8/1981 | Lockery et al. | 177/229 |
| 4,364,279 | * 12/1982 | Stern et al. | 177/211 |
| 4,506,557 | * 3/1985 | Jacobson et al. | 177/229 |

* cited by examiner

Primary Examiner—Randy W. Gibson

(57) ABSTRACT

The cost of machining a shear beam load cell can be greatly reduced by cutting pockets for the central web with a side cutting tool, such as a Woodruff Cutter or a Key Cutter tool, in a vertical spindle milling machine, so all machining can be done with one single setup. The thickness of a web formed by side cutting tools will increase slowly and gradually with distance from the center of the web, which means that there will be no abrupt shear stress changes near the strain gages. The disclosed shear beam load cell is accordingly not only less expensive to make, but also inherently more accurate than prior art shear beam load cells.

5 Claims, 2 Drawing Sheets

SHEAR BEAM LOAD CELL AND METHOD FOR MAKING IT

BACKGROUND OF THE INVENTION

The present invention relates to strain gage load cells for weighing and force measurement, and especially to an improved design of a shear beam load cell and a new method for making such load cells.

A shear beam load cell comprises a rectangular beam of load cell quality metal alloy, which has one end arranged to be supported on a base in cantilever fashion, and a free end arranged to support a vertical load. Between the supported end and the loaded end there are opposed lateral blind holes forming an I-beam section with a narrow vertical web aligned with the longitudinal axis of the cantilevered beam. Strain gages aligned to measure principal stress due to shear strain are bonded to both sides of the web, and are connected in a bridge circuit for measuring the vertical load applied to the load cell.

Known designs for shear beam load cells can provide high accuracy with low sensitivity to off-center loads, torque and horizontal forces affecting the load application area, so they are widely used in heavy duty weighing applications. The machining of known shear beam load cells requires multiple machining set-ups, however, so the machining cost is a large portion of the cost for such load cells.

SUMMARY OF THE INVENTION

A main objective of the present invention is to provide a high accuracy shear beam load cell which is less costly to make than prior art shear beam load cells.

A further objective of the present invention is to provide an inexpensive shear beam load cell having nearly uniform principal strain due to shear where the strain gages are mounted.

A still further objective of the present invention is to provide a method for machining of shear beam load cells that do not require multiple machining set-ups.

These objectives are obtained by a shear beam load cell wherein both sides of the shear sensing web are cut by a side cutting vertical axle tool with a substantially cylindrical cutting surface, whereby the thickness of the web increases gradually along the axis of the beam.

Additional objects and advantages of the invention will be set forth in part in the description which follows, and, in part, will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF A PREFERRED EMBODIMENT

Figure 1:
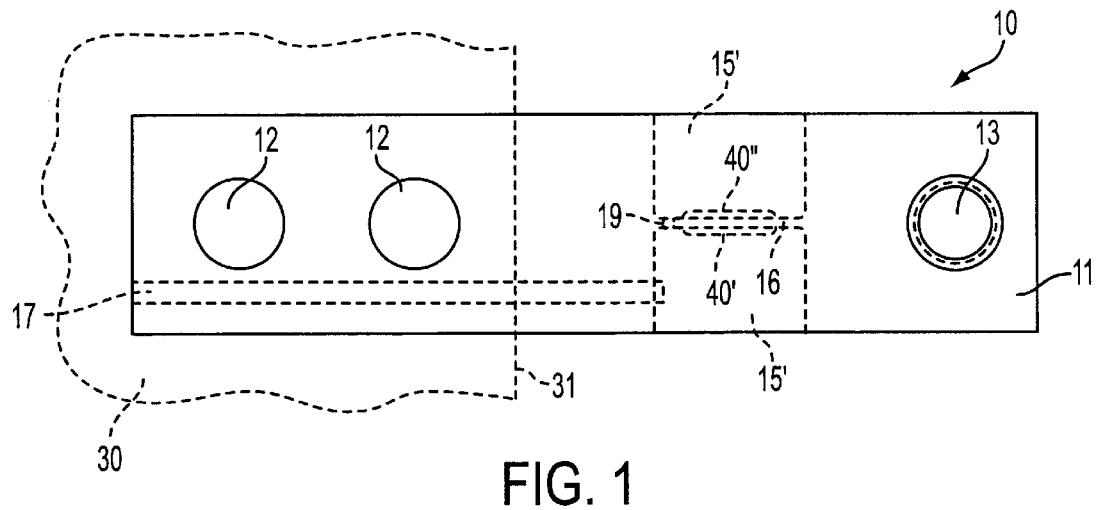
FIG. 1 is a top view of a prior art shear beam load cell.
Figure 2:
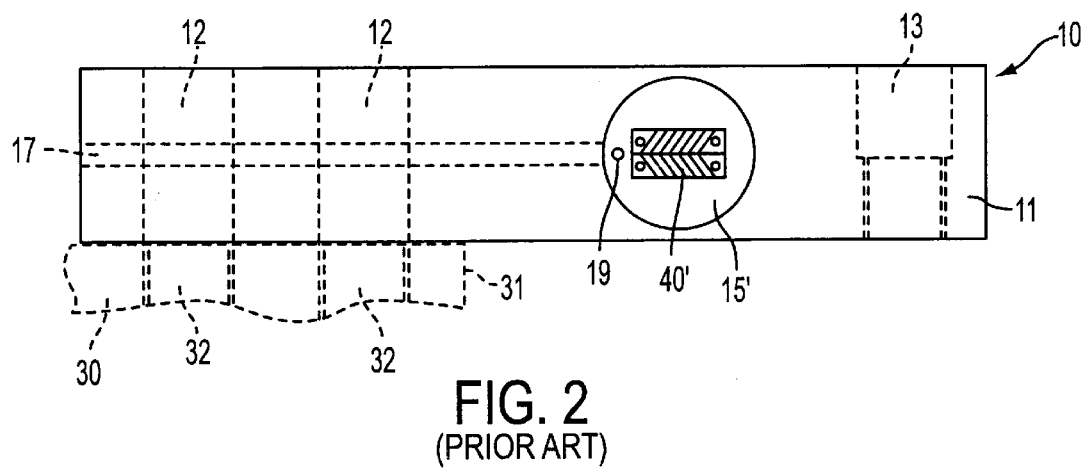
FIG. 2 is a lateral view of the prior art shear beam load cell shown in FIG. 1.

The invention will best be understood by comparison with a typical prior art shear beam load cell, which is shown in FIGS. 1 and 2. The prior art load cell 10 is made from an elongated rectangular beam 11 of load cell quality metal, such as aluminum, steel or stainless steel alloy. The beam 11 has vertical holes 12 for bolts (not shown) for mounting the load cell 10 on a base 30 with threaded bolt holes 32, and a centered, vertical load application hole 13. It further has an I-beam like section with a thin, flat web 16 centered between the sides of the beam 11, formed by symmetrically opposed lateral blind holes 15', 15". Shear sensing strain gages 40', 40" are bonded to both sides of the web 16. A hole 19 through the web 16 provides passage for wires (not shown) between the two strain gages 40', 40", and a hole 17 for a cable (not shown) from both strain gages 40', 40" leads from one end of the beam 11 through a side wall in one blind hole 15'.

The web 16 must have flat and parallel surfaces on both sides and must be perpendicular to the bottom of the load cell 10. This requires that both sides of a blank for the beam 11 must be square to the bottom surface, so a first machining set up is required for machining of the sides of the blank parallel to each other and square to the bottom surface, before any hole cutting can start. Four more set-ups are then required for milling of the holes in the beam 11: A first set-up for cutting of the vertical holes 12, 13, a second set-up to cut a blind hole 15' from one side of the blank, a third set-up to cut the second blind hole 15" from the other side of the blank and a small hole 19 through the web 16, and a fourth set-up to cut the cable hole 17 from one end of the blank. The machining of a beam 11 for a prior art shear beam load cell 10 thus requires a total of five machining set-ups. The capacity rating for prior art shear beam load cells 20 is usually changed by varying the thickness of the web 16 only, while the size of the blank and the diameters of the lateral blind holes 15', 15" are kept constant for a range of load cell ratings.

Figure 3:
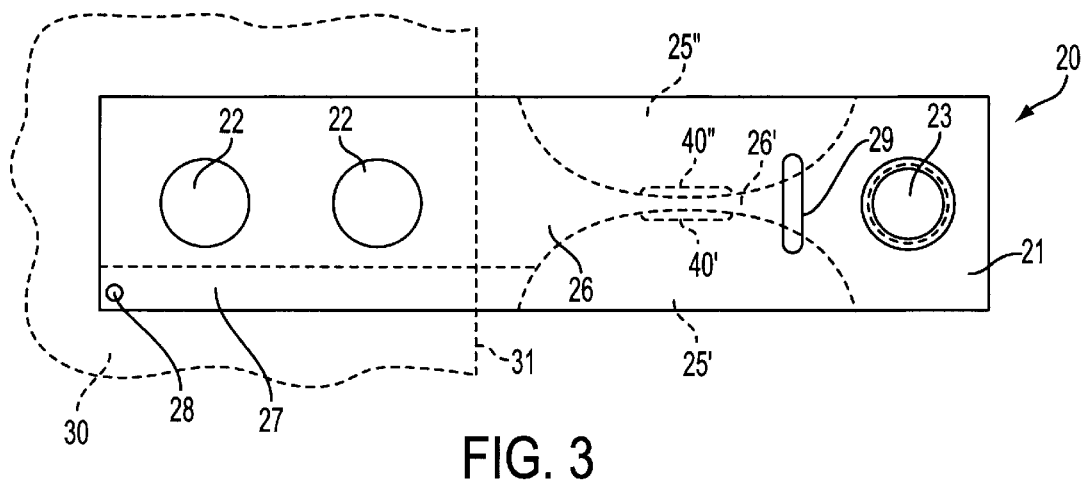
FIG. 3 is a top view of a shear beam load cell according to the invention.
Figure 4:
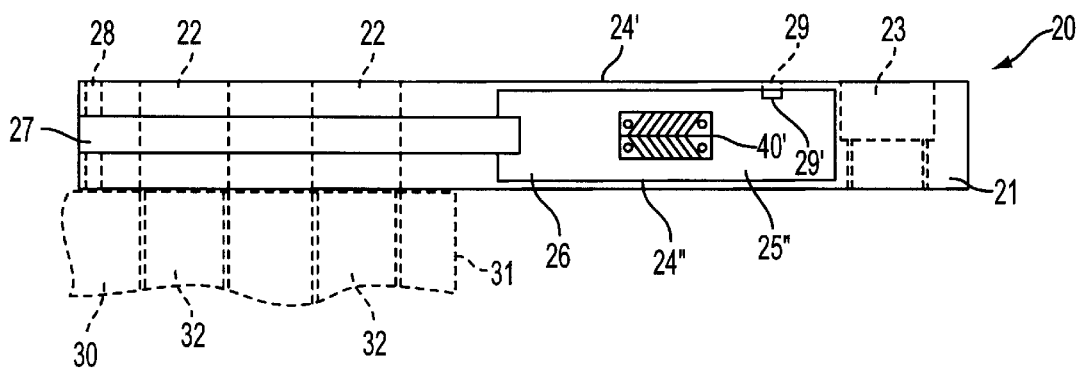
FIG. 4 is a lateral view of the shear beam load cell shown in FIG. 3.

A shear beam load cell according to the invention is shown in FIGS. 3 and 4. The load cell 20 is made from a beam 21 of load cell quality metal alloy, with vertical mounting holes 22 and a vertical loading hole 23, as in the prior art load cell 10. In a load cell 20 according to the invention the web 26 is, however, formed by wide lateral pockets 25', 25" with top and bottom flanges 24', 24", instead of by blind holes 15', 15". The center part 26' of the web 26 is flat, but the thickness of the web 26 increases gradually with distance from the flat center area 26'. Strain gages 40', 40" sensing principal strain due to shear are bonded to each side of the flat center part 26' of the web 26. A vertical slot or hole 29 is cut through the top flange 24' into a thick area of the web 26 to provide an opening 29' for wiring (not shown) between the two strain gages 40' and 40". The hole 29 is preferably located near the loading hole 23, where the bending moment in the beam 21 is small. A channel 27 for a cable (not shown) from the two strain gages 40', 40" is cut along one side of the beam 21, and a small vertical hole 28 is provided for a cable restraint (not shown) to prevent the cable in the channel 27 from being ripped out.

Cuts for the pockets 25', 25" and the cable channel 27 can be made by side cutting tools in a vertical spindle machine without changing the set-up of a blank 21' for the beam 21 before or after cutting of the vertical holes 22, 23, 28 and 29, and a blank 21' cut to length from a rectangular bar can be set up for milling without any pre-machining of its surfaces.

Only one single set-up is thus required for all machining of a beam 21 for a shear beam load cell 20 according to the invention. Machining of a beam 21 for a shear beam load cell 20 according to the invention is thus much less costly than machining of a beam 11 for a prior art load cell 10.

In any shear beam load cell 10 or 20 the vertical shear force is the same in all cross sections of the beam 11 or 21 between the edge 31 of the support 30 and the loading hole 13 or 23, so the shear stress varies inversely with the cross section along the beam 11 or 21. In a shear beam load cell 20 according to the invention the cross section decreases gradually from the left edge of the recesses 25', 25" as the thickness of the web 26 diminishes from the full width of the beam 21 to a minimum at the center area 26' of the web 26, and then it gradually increases again towards the loading hole 23. The shear stress thus develops gradually until it becomes uniform near the strain gages 40', 40". This is advantageous in as much as the gradually developed principal strain due to shear near the strain gages 40', 40" is less sensitive to load placement, and improved off-center load sensitivity results. The strain gages 40', 40" are thus positioned in an area where the principal strain due to shear is quite uniform and less sensitive to point of load application. In the prior art shear beam load cell 10 the distribution of the principal strain due to shear is much less favorable, because the shear stress changes abruptly at the right and left ends of the blind holes 15', 15", close to the strain gages 40', 40", and the strain where the strain gages 40', 40" are bonded is therefore more sensitive to point of load application. A shear beam load cell 20 according to the invention is thus inherently more accurate than a prior art shear beam load cell 10.

Figure 5:
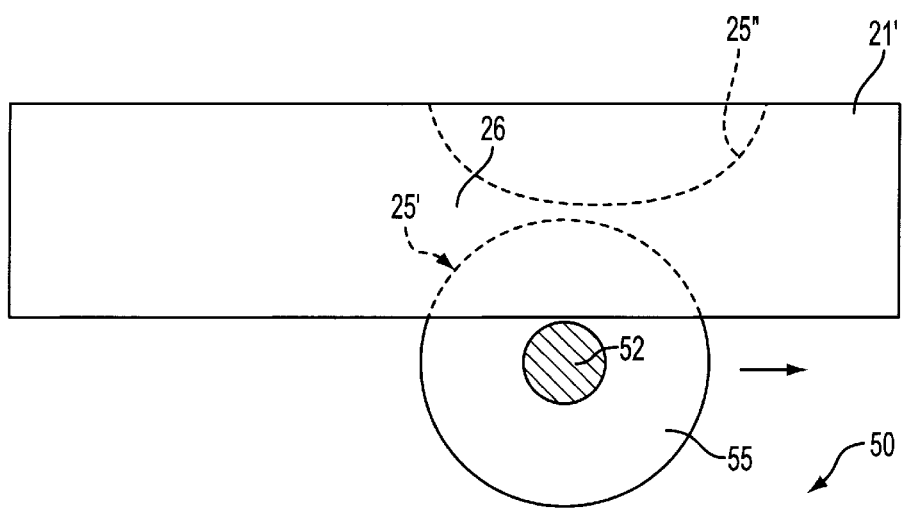
FIG. 5 is a top view of a machining set-up for a shear beam load cell according to the invention.

A method according to the invention for machining the web pockets 25', 25" in a blank 21' for a shear beam 21 is illustrated in FIG. 5, which is a simplified top view of a milling machining set-up. A blank 21' is mounted on a milling table 50 in a vertical spindle milling machine. A side cutting tool 55, also called a Woodruff cutter or a Key Cutting tool, with substantially vertical cutting edges defining a cylinder surface, is mounted on a vertical spindle 52. FIG. 5 shows the cutting tool 55 in a position where it has completed cutting of the left side of a pocket 25'. The cutting tool 55 will next be moved to the right, parallel to the axis of the blank 21', as indicated by the arrow, for cutting a flat center part of the pocket 25' as it moves towards the right side of the pocket 25'. When finished, the pocket 25' will mirror the opposing pocket 25", which is indicated in FIG. 5 for reference. The second pocket 25" is machined the same way as described above, but with the cutting tool 55 at the other side of the blank 21'.

Next, a narrower side cutting tool is used to cut a slot 27 at the left side of the blank 21'. Finally, vertical holes 22, 23, 28 and 29 will be cut from above the blank, before the machined beam 21 is removed from the milling table. All required machining has thus been made without moving the blank 21' between different machining setups.

Those skilled in the art will understand that it may be advantageous to use side cutting tools with small radii at their top and bottom cutting edges to cut the pockets 25', 25". This eliminates sharp corners between the web 26 and the top and bottom flanges 24', 24", and thereby reduces the risk for fatigue cracks. The invention is indifferent to small transition radii between the web 26 and the flanges 24', 24".

It is easy to change the height of a web 26 machined with the method described above. Pockets 25', 25" with different heights can be cut with side cutting tools matching the height of the pockets 25', 25", or one cutting head 55 with low height can make several passes at different vertical positions of the tool 55 as required to cut the different pocket 25', 25" heights. It is thus advantageous to change the load rating for shear beam load cells 20 according to the invention by changing the height of the beam 21 and the height of the web 26, while the length and width of the beam 29 are kept constant. In a shear beam load cell 20 according to the invention the thickness of the flanges 24', 24" and the cross section of the web center 26' are selected to achieve the required strain level.

A typical prior art shear beam load cell 10 rated 500 kg (1,100 lbs.) is shown in full scale in FIGS. 1 and 2, and a shear beam load cell 20 according to the invention for the same load rating (500 kg) is shown in full scale in FIGS. 3 and 4. The 500 kg shear beam load cell 20 according to the invention clearly uses much less high quality load cell material than the prior art 500 kg load cell. Only when the load rating for a shear beam load cell 20 according to the invention is increased to 2,000 kg (4,400 lbs.) it will need a height as large as shown in FIG. 2, The amount of high quality material used thus increases with the capacity for a load cell 20 according to the invention, in contrast to prior art load cells 10, where the amount of material used is the same for a wide range of load cell capacities, thereby employing more material than is necessary in the lower capacities at correspondingly greater expense.

When using blanks 21' cut to length from a raw bar without any machining before the milling of the beam 21, it is not possible to keep the width of the beam 21 within close tolerances. The pockets 25', 25" are cut from opposite sides of the blank 21', so a central position for the web 26 is easily obtained, but the thickness of the central part of the web 26 might vary with the width of the blank 21'. This could cause variations in sensitivity from one load cell 20 to another in the same batch. Gross variations in width can be corrected at low expense by machining the central part of both sides of the blanks 21' while they are set up in the vertical spindle milling machine. Small variations in sensitivity are normal, even in load cells made from pre-milled blanks, but such sensitivity variations are detected during production testing of each individual load cell in a calibration press, and the sensitivity is always standardized, usually by resistive loading of the strain gages 40', 40", as is well known in the art.

In a production line, multiple shear beam blanks 21' can be set up on a common milling machine table at one time, and all machining with one cutting tool can be performed on all blanks in sequence before the cutting tool is changed. It is even possible to mix different size blanks in one set-up, by making multiple passes with the pocket cutting tool as described above. Such multiple blank set-up is possible because side cutting milling tools on a vertical spindle can move between individual blanks without need for more space than the diameter of the largest side cutting tool. Such a multiple cutting procedure further reduces the cost of shear beam load cells according to the invention.

The vertical loading hole 23 corresponds exactly to the loading hole 13 in prior art load cell, and is subject to the same considerations. It is usually preferred to have the loading surface near the vertical center of the beam 23, as disclosed in U.S. Pat. No. 3,960,228. This may be achieved with a stepped hole as shown in FIGS. 3 and 4 by inserting a hardened plug with a flat top to the stepped hole 23, as is common practice in the art. Different types of loading holes 23 may also be used within the scope of the invention.

In the description above it has been assumed that the web 26 is formed with a flat center area where strain gages are to be bonded. It is, however, permissible to bond strain gages to a cylindrical surface instead of to a flat surface, especially if the strain gages are small in size. Flat areas at the center of the web 26 are accordingly not necessarily required for the present invention.

The wide pockets 25', 25" forming the web provide easy access for accurately positioning and bonding of strain gages, and also makes it easy to seal the strain gages against moisture with multiple layers of sealant material, and they provide long leakage paths.

It should be understood that the end cutting tools used to cut the pockets 15', 15" in prior art shear beam load cells have a small radius on the ends of their cutting edges, so a smooth transition is obtained between a web 16 and the walls of the blind holes 15', 15". This is necessary to avoid sharp corners, which can cause fatigue cracks in load cells, as is known in the art. Such stress relieving transitions with small radii should not be confused with the gradual thickening of the web 26 in a shear beam load cell 20 according to the invention.

A shear beam load cell according to the invention has the desirable property of being less expensive and at the same time more accurate than a prior art load cell, so it is an important step forward in load cell technology.

The scope of the invention shall not be limited by any details in the text above, or by any details of the accompanying figures. Only the wording of the claims shall limit the scope of the invention.

What is claimed is:

1. A shear beam load cell, comprising a beam having two ends and an I-beam section with a vertical web positioned between said ends along a longitudinal axis in said beam, wherein said web has a lateral thickness that increases gradually toward both ends of the beam.

2. A shear beam load cell according to claim 1, wherein said web has a center section of constant thickness, and the thickness of the web increases gradually in both directions from said center section until it equals the full width of said beam.

3. A shear beam load cell according to claim 2, wherein said web is formed by a side cutting tool on a vertical spindle, whereby the total length of said web section is larger than said lateral width of said beam.

4. Method for making a shear beam load cell, comprising the steps of:
    providing an elongated block of metal with substantially rectangular cross section having two lateral surfaces;
    mounting said block on a machining table in a vertical spindle milling machine with said lateral surfaces vertically oriented; and
    cutting symmetrically opposed lateral pockets into said lateral surfaces of said block with a side cutting tool to form a vertical web of varying thickness centered between said lateral surfaces.

5. Method for making a shear beam load cell according to claim 4, including the further step of making at least one cut in said block with an end cutting tool.

\* \* \* \* \*